United States Patent
Pedersen

(10) Patent No.: US 10,907,615 B2
(45) Date of Patent: Feb. 2, 2021

(54) METHOD OF CORRECTING ROTOR IMBALANCE AND WIND TURBINE THEREOF

(71) Applicant: Envision Energy (Denmark) ApS, Silkeborg (DK)

(72) Inventor: Keld Stefan Pedersen, Vejle (DK)

(73) Assignee: Envision Energy (Denmark) ApS, Silkeborg (DK)

(*) Notice: Subject to any disclaimer, the term of this patent is extended or adjusted under 35 U.S.C. 154(b) by 155 days.

(21) Appl. No.: 15/568,508

(22) PCT Filed: Apr. 20, 2016

(86) PCT No.: PCT/EP2016/058723
§ 371 (c)(1),
(2) Date: Oct. 23, 2017

(87) PCT Pub. No.: WO2016/169963
PCT Pub. Date: Oct. 27, 2016

(65) Prior Publication Data
US 2018/0142676 A1    May 24, 2018

(30) Foreign Application Priority Data
Apr. 23, 2015 (DK) .................................. 2015 70239
Jul. 14, 2015 (DK) .................................. 2015 70465

(51) Int. Cl.
F03D 13/35    (2016.01)
F03D 7/02     (2006.01)

(52) U.S. Cl.
CPC ............. *F03D 13/35* (2016.05); *F03D 7/024* (2013.01); *F03D 7/0224* (2013.01); *F03D 7/0296* (2013.01)

(58) Field of Classification Search
CPC ...... F03D 7/0224; F03D 7/0296; F03D 7/045; F03D 13/35; F03D 17/00
See application file for complete search history.

(56) References Cited

U.S. PATENT DOCUMENTS

| | | |
|---|---|---|
| 5,140,856 A | 8/1992 | Larsen |
| 5,219,454 A | 6/1993 | Class |

(Continued)

FOREIGN PATENT DOCUMENTS

| | | |
|---|---|---|
| CN | 101092931 A | 12/2007 |
| CN | 102338034 A | 2/2012 |

(Continued)

OTHER PUBLICATIONS

English Translation of ES2376815B1 description (Year: 2013).*
International search report (Year: 2017).*
SIPO First Office Action (translated) (Year: 2019).*

*Primary Examiner* — Eldon T Brockman
*Assistant Examiner* — Wesley Le Fisher
(74) *Attorney, Agent, or Firm* — James Creighton Wray

(57) ABSTRACT

The present invention relates to a method of correcting rotor imbalance and a wind turbine thereof. The correction method comprises measuring the vibrations within at least one time window and determining an imbalance factor and an imbalance phase. The values of the parameters in the equation for calculating the correction action are then updated based on the imbalance factor and an imbalance phase. A correction angle for each of the wind turbine blades is calculated using these adjusted parameters. The correction angle is used to aerodynamically balance the rotor, and a model may be used to determine the initial values of the parameters. Another imbalance factor and imbalance phase is determined based on another set of measurements. This imbalance factor is then used to calculate a mass moment for correcting the mass imbalance in the wind turbine blades.

(Continued)

The weight and location of a balancing mass is finally calculated based on this mass moment and installed in the respective wind turbine blades.

17 Claims, 8 Drawing Sheets

(56) References Cited

U.S. PATENT DOCUMENTS

| | | | |
|---|---|---|---|
| 8,261,599 B2 | 9/2012 | Jeffrey | |
| 2007/0294049 A1 | 12/2007 | Pierce | |
| 2009/0035136 A1 | 2/2009 | Pierce | |
| 2009/0266160 A1* | 10/2009 | Jeffrey | G01H 1/006 |
| | | | 73/455 |
| 2010/0289266 A1 | 11/2010 | Wortmann | |
| 2011/0142593 A1 | 6/2011 | Hoffmann | |
| 2011/0229300 A1 | 9/2011 | Kanev | |
| 2012/0055247 A1* | 3/2012 | Gonzalez Castro | G01M 1/28 |
| | | | 73/455 |
| 2012/0180314 A1* | 7/2012 | Axelsson | F03D 7/0224 |
| | | | 29/889.1 |
| 2012/0183399 A1* | 7/2012 | Perkinson | F03D 7/0224 |
| | | | 416/1 |
| 2012/0186343 A1 | 7/2012 | Egedal | |
| 2013/0209254 A1 | 8/2013 | Hess | |
| 2013/0294911 A1 | 11/2013 | Egedal | |
| 2013/0325373 A1 | 12/2013 | Qiao | |
| 2014/0037448 A1* | 2/2014 | Fu | F03D 7/0224 |
| | | | 416/1 |

FOREIGN PATENT DOCUMENTS

| | | | | |
|---|---|---|---|---|
| CN | 102483037 A | 5/2012 | | |
| CN | 102954858 A | 3/2013 | | |
| CN | 103573552 A | 2/2014 | | |
| CN | 104454350 A | 3/2015 | | |
| EP | 1978246 A1 | 10/2008 | | |
| ES | 2376815 B1 * | 2/2013 | | F03D 7/0296 |
| WO | 2009129617 A1 | 10/2009 | | |
| WO | 2011032606 A1 | 3/2011 | | |

* cited by examiner

METHOD OF CORRECTING ROTOR IMBALANCE AND WIND TURBINE THEREOF

FIELD OF THE INVENTION

The present invention relates to a method for correcting a rotor imbalance in a wind turbine comprising a wind turbine tower, a nacelle, and a generator connected to a rotatable rotor with at least two wind turbine blades.

The present invention also relates to a wind turbine comprising a wind turbine tower, a nacelle, a generator connected to a rotatable rotor with at least two wind turbine blades, and a control system configured to execute the control method mentioned above.

BACKGROUND OF THE INVENTION

It is well-known that a wind turbine rotor needs to be balanced during rotation to achieve a high energy yield and to reduce vibrations in the wind turbine, including the rotor, to a minimum. Rotor imbalances may be caused by uneven weight distribution in the wind turbine blade (mass imbalance) or deviations from the normal or ideal aerodynamic properties (aerodynamic imbalance). Mounting and manufacturing tolerances may also produce rotor imbalance if the wind turbine blade is mounted with a tolerance in the mounting angle or if the mounting interface of the hub or the blade root is not planar. It is known that erosions on the leading edge profile due to wear, cracks in the outer surface due to lighting strikes, built-up of ice or other particles on the outer surface, or other conditions may degrade the aerodynamics of the wind turbine blades. Any rotor imbalance will lead to vibrations and dynamic loads in the rotor and in the rest of the wind turbine, thereby reducing the lifetime of the components inside the wind turbine as well as reducing the energy yield and power output.

It is known to use a laser located on the nacelle to optically measure the aerodynamic imbalance on an offshore wind turbine or place a camera in front of an onshore wind turbine. The received reflected signals or captured images are then analysed to determine any deviations between the individual pitch angles. If a deviation is detected, the respective pitch angle is corrected. Temporary test weight elements are added to the interior or exterior of one wind turbine blade to cause a mass imbalance, the vibrations and phases are then measured using a separate measuring box. A balancing weight is calculated and applied, and the test weight elements are removed.

U.S. Pat. No. 8,261,599 B2 discloses a balancing method wherein a camera is positioned below the rotor for capturing images of the wind turbine blades which are then analysed to determine the aerodynamic imbalance. Firstly, the rotor is locked and the wind turbine blades are pitched to a reference pitch angle. The rotor is then rotated to place each wind turbine blade in front of the camera and an image of each blade is captured. The pitch angle for each wind turbine blade is then determined and compared to a pre-set tolerance range. If the pitch angle is not within this range, then the pitch angle is adjusted until it becomes within this range.

This balancing method additionally uses vibration sensors and accelerometers to measure vibrations in the rotor which are then analysed to determine the mass imbalance of the rotor. A first vector representing the averaged amplitude and averaged phase of the rotor imbalance is determined based on a first set of measurements. Test weights are then placed at a predetermined position from the centre of the hub and a second vector is detected based on a second set of measurements. The weight and location of a suitable balancing weight is calculated based on the difference between the second and first vectors. The test weights are removed and the balancing weight is added at the determined position. A final set of measurement is carried out to determine whether the vibrations are within the acceptable tolerances. If not, then the balancing process is repeated.

This solution requires workers to travel to the wind turbine site or park and to position the camera relative to the wind turbine and add test weights on a wind turbine blade. This increases the complexity and costs of the balancing process.

US 2012/0183399 A1 discloses another method of correcting aerodynamic imbalance, wherein the rotor imbalance is measured using vibration sensors and a tachometer. In this control method, at least two pitch offsets are applied to the wind turbine where the vibrations are measured after each pitch offset. A controller calculates a maximum vibration amplitude and a rotor rotational position for each measurement. The controller then determines a corrective pitch angle based on these maximum vibration amplitudes and rotor rotational positions. This corrective pitch angle is then applied to the wind turbine blades. It is stated that said corrective pitch angle can further be determined as function of the wind speed in order to compensate for a mass imbalance. However, this correction in the pitch angle is not suitable for mass correction as it alters the aerodynamic performance of the wind turbine blades and thus affects the power production of the wind turbine. This control scheme is also not able to distinguish between an aerodynamic imbalance and a mass imbalance, nor is it able to correct an imbalance at all wind speed conditions. This control method is furthermore not able to effectively remove the rotor imbalance. Instead, it merely reduces it to a more acceptable level.

U.S. Pat. No. 5,219,454 A discloses a balancing method wherein balancing weights are mounted to an L-shaped bracket located at the mounting interface between the blade root and the hub. In a trial run of the balancing method the imbalance is initially measured using an accelerometer placed on the main bearing after which the bracket is mounted to the rotor. A second measurement is then performed. A controller determines the imbalance amplitude and the imbalance phase based on the two sets of measurements. A corrective mass is then calculated based on the imbalance amplitude and the imbalance phase, which is then mounted to the bracket. This solution requires a worker to access the exterior of the rotor in order to mount the bracket and again when mounting the corrective mass, thereby adding time to the balancing process. By placing the bracket and balancing weights on the exterior of the rotor, they are subjected to environmental impacts as well as aerodynamic forces generated when rotating the rotor.

OBJECT OF THE INVENTION

An object of this invention is to provide a balancing method for correcting an aerodynamic imbalance without the use of a camera or laser technique.

An object of this invention is to provide a balancing method for correcting a mass imbalance without test weights placed on the wind turbine blades.

An object of this invention is to provide a balancing method for determining an imbalance factor based on the measured vibration data.

An object of this invention is to provide a wind turbine with a control system that enables the balancing mass and correction angle to be determined remotely.

DESCRIPTION OF THE INVENTION

In the description below, and unless otherwise specified, the general term "rotor imbalance" refers to any aerodynamic imbalance and any mass imbalance. Unless otherwise specified, the general term "correction action" refers to any pitch angle adjustment for an aerodynamic imbalance correction and any balancing mass moment for a mass imbalance correction.

An object of the invention is achieved by a method of correcting a rotor imbalance of a wind turbine, the wind turbine comprising a wind turbine tower, a nacelle arranged on top of the wind turbine tower, and a generator connected to a rotatable rotor with at least two wind turbine blades, wherein the method comprises the steps of:
  measuring vibrations of the rotor within at least one time window,
  detecting a mass imbalance of the rotor, the rotor has a mass distribution defined by each of the wind turbine blades, wherein the mass imbalance is indicative of a rotor with a temporary unmodified mass distribution,
  analysing the measured data to determine at least one imbalance factor and at least one imbalance phase,
  applying at least one correction action to at least one of said wind turbine blades, wherein the at least one correction action is determined based on the at least one imbalance factor and the at least one imbalance phase, the at least one correction action comprises calculating a balancing moment indicative of a mass correction of the at least one of said wind turbine blades.

This provides a more exact correction method for determining the correction action needed to balance the rotor compared to the known correction methods. No need for workers to visit the wind turbine site and set up test equipment for measuring the rotor imbalance. The required correction action for each wind turbine blade is calculated based on at least the imbalance factor using any type of a control system. The control system may be a remote computer or monitoring unit, an internal or distributed controller (such as programmable logic controllers or arrays), or another suitable control system used to control or monitor the operation of the wind turbine. The correction method may be implemented as an automated process in the control system or a manual process carried out by the operator or worker. This reduces the time and costs for correcting the rotor imbalances as the worker only has to visit the wind turbine to install a balancing mass or adjust the fixed pitch angle of the wind turbine blades, if needed. The required correction angle may instead be implemented remotely by the operator/worker or the control system if the wind turbine is equipped with a pitch system connected to at least a part of the wind turbine blade.

The vibrations are measured as accelerations in a fixed frame of reference which is defined by the nacelle or the upper end of the wind turbine tower. Alternatively, the vibrations may be measured in a rotary frame of reference defined by the rotor hub or the wind turbine blade and then transformed to the fixed frame of reference for later analysis in the control system. The vibrations are measured along a longitudinal/axial or transverse/lateral axis of the nacelle, preferably along both axes. This enables the vibrations to be measured in at least one axial and/or lateral direction, preferably in opposite directions along each respective axis. This allows the control system to detect any aerodynamic or mass imbalance based on the direction or directions in which the vibrations occur.

The rotational position is measured as the angular position of the wind turbine blades in the rotor plane relative to a reference angle, e.g. a vertical position of the wind turbine blade where its tip end faces away from the wind turbine tower. A pre-selected frequency, such as the 1P frequency defined by the rotational speed of the rotor, is used to determine an amplitude of the rotor imbalance, i.e. an imbalance amplitude. The imbalance factor is in turn calculated as function of this amplitude. At the same time a phase of the rotor imbalance, i.e. an imbalance phase, is determined as the rotational position in which this imbalance amplitude has the greatest value, e.g. maximum or minimum peak value. This phase is further used to determine which of the wind turbine blades that needs to be corrected. The imbalance factor and imbalance phase may be determined for each direction of the measured vibrations, such as in the axial and/or lateral direction.

Depending on the configuration of the wind turbine, the correction process is activated when the wind turbine is producing power, preferably when the power output is below the rated power output, and/or before the pitching of the wind turbine blades is initiated.

According to a special embodiment, the rotor has a mass distribution defined by each of the wind turbine blades, wherein the mass imbalance is indicative of a rotor with a temporary unmodified mass distribution.

Conventional imbalance correction methods require test weights to be temporary placed on the exterior surface of one of the wind turbine blades. These test weights temporary modify the mass distribution and, thus, the mass imbalance of the rotor, which is afterwards measured via another set of measurement. This measurement along with an initial measurement of the unmodified mass distribution and, thus, the initial mass imbalance are used to determine the required mass correction.

The present control method allows the mass correction to be determined without the use of temporary test weights. This further eliminates the need for the worker to climb out onto the wind turbine blade and secure the test weights which is both time consuming and requires the use of various safety systems. The balancing moment can thus be determined directly from the vibration measurements without altering the mass distribution of the rotor, e.g. of one or more wind turbine blades. The present control method allows any mass imbalance to be corrected regardless of its size.

According to one embodiment, the step of analysing the measured data further comprises determining at least one imbalance amplitude based on the measured data, wherein the at least one imbalance factor is calculated as function of said at least one imbalance amplitude.

The vibrations, the rotational positions, the rotational speed or other relevant control parameters are measured within a number of predetermined time windows, e.g. one, two, three, or more. The length of the respective time windows for each individual control parameter may be selected or determined according to one or more predetermined criteria, such as the rotational speed. The measurements, e.g. set of measured data, are stored either locally in a memory unit of the internal or distributed controller or remotely in a memory unit of the remote computer or monitoring unit. The control system then analyses these measured data to determine an imbalance factor and an imbalance phase of the rotor imbalance for each time window.

The control system transfers the measurements, e.g. at least the vibration data, into the frequency domain using a Fast Fourier Transform (FFT) algorithm, a Finite Impulse Response (FIR) filter algorithm, or another suitable algorithm. The control system analyses the frequency transformed data and determines the imbalance amplitude and the imbalance phase of the measured rotor imbalance for each respective time window. This imbalance amplitude, e.g. the 1P amplitude, may be determined as a peak amplitude or an averaged amplitude centred around the selected frequency, e.g. the 1P frequency. The imbalance factor may for example be determined as a ratio of this imbalance amplitude to the rotational speed. The rotational speed may further be raised to a power of n. The power n may be four. For example, the control system may determine one imbalance factor and one imbalance phase in the axial direction and/or another imbalance factor and another imbalance phase in the lateral direction. These determined or calculated values, e.g. the imbalance factors, the imbalance phases, the correction angles, and the mass moments, are further stored in the memory mentioned above.

The present control method allows for a normalization of the imbalance amplitude using the rotation speed as a normalization factor. This enables the control method to correct any arbitrary rotor imbalances, including large mass imbalances, for all rotational speeds and, thus, all wind speed conditions. Using the rotational speed as a parameter instead of the wind speed, also allows for a better tolerance of the present control system.

According to one embodiment, the method further comprises the steps of:
  measuring vibrations and rotational positions of the rotor within a first of said time windows, and analysing the measured data to determine at least a first imbalance factor and a first imbalance phase,
  applying a first of said correction actions based on at least the first imbalance factor and the first imbalance phase,
  measuring vibrations and rotational positions of the rotor within a second of said time windows, and analysing the measured data to determine at least a second imbalance factor and a second imbalance phase,
  applying a second of said correction actions based on at least the second imbalance factor and the second imbalance phase.

In a first embodiment, the control parameters mentioned above are measured within at least two time windows, e.g. the first and second time windows, in an initial or first run of the correction process. The control system then determines an imbalance factor and an imbalance phase for each of the first and second time windows. A first correction action is calculated and applied after the first measurement. A second control action is afterwards calculated and applied after the second measurement. This also enables the parameters used to calculate this correction action to be adjusted to the changing rotor imbalance as described later. In any subsequent (second, third, fourth, etc.) runs of the correction process, the control parameters are measured within a least one time window, e.g. a third time window, and thus the control system determines at least one (third) imbalance factor and/or imbalance phase based on this third measurement optionally using these adjusted parameters.

This measuring step may be repeated for at least two sub-time windows within at least one of these above-mentioned measuring steps. The sub-time windows form the time window mentioned above. The control system may calculate a corresponding number of imbalance factors for these individual sub-time windows. These imbalance factors may then be averaged to define a single imbalance factor for the respective time window. The control system may further determine the imbalance phase of the individual sub-time windows. These imbalance phases may likewise be averaged to define a single imbalance phase. By repeating the measuring step for a predetermined number of time windows or by increasing or decreasing the length of the measuring time window, the accuracy of the correction method is increased as well as any fast and temporary impacts, like wind gusts, are less likely to influence the calculated correction action.

According to one embodiment, the method further comprises the steps of:
  measuring vibrations of the rotor within a first of said time windows, and analysing the measured data to determine at least a first imbalance factor and a first imbalance phase,
  applying a first rotor imbalance,
  measuring vibrations of the rotor within a second of said time windows, and analysing the measured data to determine at least a second imbalance factor and a second imbalance phase,
  applying a second rotor imbalance,
  measuring vibrations of the rotor within a third of said time windows, and analysing the measured data to determine at least a third imbalance factor and a third imbalance phase,
  wherein the at least one correction action applied is based on at least one of the first, second and third imbalance factors and at least one of the first, second and third imbalance phases.

In a second embodiment, the control parameters mentioned above are measured within at least three time windows, e.g. the first, second and third time windows, in an initial or first run of the correction process. The control system then determines an imbalance factor and an imbalance phase for each of the first, second and third time windows. A first deterministic imbalance or correction action, e.g. the first rotor imbalance, is applied to the rotor after the first measurement. A second deterministic imbalance or correction, e.g. the second rotor imbalance, is applied to the rotor after the second measurement. The deterministic imbalances may be any aerodynamic and/or mass imbalance. The control system then calculates a required correction action based on these first, second and third imbalance factors and imbalance phases. This also enables these parameters used to calculate the correction action to be adjusted to the changing rotor imbalance as described later. In any subsequent (second, third, fourth, etc.) runs of the correction process, the control parameters are measured within a least one time window, e.g. a four time window, and thus the control system determines at least one imbalance factor and/or imbalance phase based on this fourth measurement optionally using these adjusted parameters.

According to one embodiment, the method further comprises the step of:
  correcting at least one parameter used to calculate the respective correction action based on the at least one imbalance factor.

Once the correction process is completed or when a correction action has been applied, one or more of the parameters in the equations (1), (3) below may be adjusted utilising one or more of the currently or previously determined imbalance factors and/or imbalance phases. For example, these parameters may be adjusted based on the currently determined imbalance factor and/or imbalance phase. In a simplified embodiment, an error is calculated between the current imbalance factor and a reference value which in turn is used to adjust the respective parameter. Other correction techniques may be implemented to refine the values of these parameters. This allows for a more exact calculation of the required correction action according to the changing rotor imbalance as the parameters are adjusted after each correction action to provide a better representation of the actual conditions.

The parameters may include a proportionality parameter, k, which depends on the structural properties of the wind turbine system and the type of rotor imbalance. The parameter k may be used to calculate the aerodynamic imbalance or the mass imbalance depending on the selected units for this parameter. The parameters may further include a phase delay, $\alpha_0$, indicative of an offset between the rotational position of the imbalance and the measured imbalance phase. For example, the control system may determine a first set of parameters in the axial direction and/or a second set of parameters in the lateral direction.

According to one embodiment, the step of calculating the correction action further comprises calculating of a weight or a position of a balancing mass based on the balancing moment, wherein the balancing mass is then applied to the at least one of said wind turbine blades.

Initially, the required rotor imbalance correction is in example, but not limited to, determined on the imbalance factor and the imbalance phase:

$$\Sigma_{n=1}^{N} \mu_n \cdot e^{i \cdot \varphi_n} = k \cdot f \cdot e^{i \cdot (\alpha - \alpha_0)} \quad (1)$$

Where N is the number of wind turbine blades, $\mu_n$ is the rotor imbalance for wind turbine blade n, $\varphi_n$ is the rotational position for wind turbine blade n, and $e^i$ defines Euler's formula in which i defines the imaginary number of $\sqrt{-1}$, f is the imbalance factor and $\alpha$ is the imbalance phase. Depending on the location of the accelerometers, the system behaviour of a rotary frame of reference may be included in the equation. The initial values of the parameters, e.g. the parameter k and the phase delay $\alpha_0$, of the equation (1), may be determined using a model as described later.

In the first embodiment, the initial values of the parameters k and $\alpha_0$ may be adjusted after the initial run by solving the following equation using the measured values of the first and second time windows:

$$\Sigma_{n=1}^{N} \Delta\mu_n \cdot e^{i \cdot \varphi_n} = k \cdot (f_1 \cdot e^{i \cdot (\alpha_1 - \alpha_0)} - f_2 \cdot e^{i \cdot (\alpha_2 - \alpha_0)}) \quad (2)$$

Where $\Delta\mu_n$ is the correction action for wind turbine blade n, $f_1$ is the first imbalance factor, $f_2$ is the second imbalance factor, $\alpha_1$ is the first imbalance phase and $\alpha_2$ is the second imbalance phase.

In the second embodiment, the above-mentioned equation (1) is modified as indicated in equation (3) as no measurement of the rotational position is needed:

$$\Sigma_{n=1}^{N} \mu_n \cdot e^{i \cdot \varphi_n} = k \cdot f \cdot e^{i \cdot \beta} \quad (3)$$

The initial values of the parameter k and the imbalance phase $\beta$ may be adjusted after the initial run by solving this equation (3) using the measured values of the first, second and third time windows.

Once the initial parameters of the equation have been adjusted, the subsequent correction actions can be calculated by solving the equation (1), (3) using these adjusted values for the respective parameters.

The aerodynamic imbalance correction, i.e. the correction angle, as well as the mass imbalance correction, i.e. the mass moment, is calculated using equation (1), (3) with the optionally adjusted values for the respective parameters. Preferably, the first set of parameters is used to correct any aerodynamic imbalances and the second set of parameters is used to correct any mass imbalances. This simplifies the correction method as only one equation is required for calculating the correction action, whereas the known correction methods requires two different methods for determining the correction action.

This correction method is suitable for a wind turbine having two, three or more wind turbine blades. In order to calculate the required correction actions, either at least two equations with at least two unknowns or at least three equations with at least six unknowns are determined for the axial and lateral directions respectively for at least two selected wind turbine blades. The respective equations are then solved using Cramer's rule, elimination, substitution, graphing or another suitable solution technique. The correction action for any remaining wind turbine blades may be set to zero. Another predetermined or calculated constant may thereafter be added, subtracted, multiplied, divided or otherwise collectively or individually applied to the values of $\mu_n$. In the case of an aerodynamic imbalance, this can be used to avoid that the applied correction action brings the rotor too far away from the current operating point. In example, a negative value of the rotor imbalance $\mu_n$ may indicate that the mass should be removed or that the pitch angle should be lowered for the respective wind turbine blade n. Removing mass from the wind turbine blades is not always possible. One way to overcome this is to apply a constant to all values of p, as mentioned above such that their resulting values become positive and thus enabling a mass imbalance correction.

According to one embodiment, the method further comprises the steps of:
measuring vibrations and, optionally, the rotational positions of the rotor within at least one further time window,
detecting if an aerodynamic imbalance of the rotor is present,
if said aerodynamic imbalance is present, then calculating at least a correction angle based on at least one further imbalance factor and at least one further imbalance phase of said one further time window, and applying said correction angle to the at least one of said wind turbine blades.

An aerodynamic imbalance is measured as vibrations in both the axial and lateral directions, while a mass imbalance is measured as vibrations in only the lateral direction. In a preferred embodiment, the rotor is first aerodynamically balanced before correcting any mass imbalances. The present control method is able to distinguish between aerodynamic and mass imbalances and correct these independently. This further allows any mass imbalance to be corrected regardless of its size.

The correction method periodically monitors the vibrations, e.g. the imbalance factor, in the axial and/or lateral direction to detect when a correction process is needed. This may be done automatically by the control system at regular intervals, or initiated by the remote operator. If no correction is needed (vibrations within a pre-set threshold range), the control system then returns to a sleep mode or continues with other tasks. If a correction is needed, then the control system carries out the correction process. This allows for the correction method to compensate for the changing rotor imbalance occurring over the lifetime.

The control system analyses the vibrations prior to or after the first measurement to detect whether the measured imbalance is an aerodynamic imbalance or a mass imbalance. If the control system detects that the rotor is aerodynamically imbalanced, then it calculates a correction angle for each of the wind turbine blades using equation (1), (3). The correction angle is then applied to the wind turbine blades, e.g. through the pitch system. Once the correction angles have been applied to all the wind turbine blades, the control system carries out a new measurement and analyses the newly measured set of data to detect if further aerodynamic corrections are required, e.g. the 1P amplitude in the axial direction is not within the pre-set threshold range. If so, the control system carries out another run of the correction process. Yet another measurement is carried out after this new correction angle has been applied and then analysed to detect if yet another aerodynamic correction is required. The correction process may be repeated one or more successive times, if needed.

According to one embodiment, the method further comprises the steps of:
further measuring vibrations and optionally the rotational positions of the rotor within at least one additional time window,
determining if the rotor is mass balanced, and
calculating a further balancing moment, if mass imbalanced, based on at least a further imbalance factor and at least another imbalance phase of said one additional time window, wherein this further balancing moment is indicative of a further mass correction.

If the control system during the above-mentioned analysis detects that the rotor is aerodynamically balanced, then it skips the first part of the correction process, i.e. the aerodynamic imbalance correction, or proceeds to calculate a mass correction using equation (1), (3). The required balancing or mass moment is calculated based on the imbalance factor and the imbalance phase of the current/latest measurement. This mass moment is indicative of the mass imbalance moment at the centre of the rotor. The control system then further calculates a weight, m, of the balancing mass and at the same time a position, d, of the balancing mass relative to the centre axis of the rotor hub, where $u_n = m_n \cdot d_n$. Alternatively, the mass moment correction is transmitted to a remote operator which then calculates the required weight and position of the balancing mass. The worker then travels to the site and installs the required balancing mass. Another measurement is carried out after the balancing mass has been applied to the respective wind turbine blades and then analysed. If the control system detects that further mass corrections are required, e.g. the 1P amplitude in the lateral direction is not within the pre-set threshold range, then another run of the correction process is carried out. Yet another measurement is carried out thereafter and then analysed to detect if yet another run of the correction process is needed. The correction process may be repeated one or more successive times, if needed.

This mass correction is carried out for at least one of the wind turbine blades while at least one other wind turbine blade is selected as a reference blade in which the mass correction is set to zero. Preferably, the mass correction is carried for at least two of the wind turbine blades and thereby bringing the rotor into balance as described above.

According to a special embodiment, at least one parameter used to calculate the balancing moment is transmitted to at least one other wind turbine, wherein this parameter is used to calculate a mass correction for the other wind turbine.

After the correction process, e.g. the imbalance correction, is completed and the parameters used to calculate the correction action(s) have been updated, one or more of these parameters, e.g. the constant k and/or the phase delay $\alpha_0$, may be transmitted to a number of similar wind turbines within the wind turbine park. Likewise, the control system may receive these one or more parameters from another wind turbine control system and then calculate the required imbalance correction using these parameters. This allows the parameter to be validated by using just one wind turbine and then distributed amongst other wind turbines. This provides a simple and easy way of calculating the imbalance corrections for multiple wind turbines in a wind turbine park as the parameters would be valid for wind turbines having the same or similar configurations.

According to one embodiment, the method further comprises the step of:
deriving at least one parameter used to calculate the respective correction action from a model of the wind turbine, wherein this model at least provides a representation of the vibrations in the wind turbine with a predetermined rotor imbalance.

The initial values of the parameters, e.g. the constant k and/or the phase delay $\alpha_0$, may in example be derived from a predetermined model of the wind turbine system. The modelling of the wind turbine system may be selected so it provides a simple and robust representation of the wind turbine system in the time domain or the frequency domain other suitable representations. The model may be an aeroelastic model, an autoregressive model of order X (ARX), a prediction error method (PEM), a finite element model (FEM), or another suitable mathematical model. Various models exist for modelling the accelerations of a wind turbine top, such as proposed by Jenny Niebsch, 2010 or Torben Knudsen, et al., 2012. The rotational speed of the rotor may be used as an input for this model. This allows the measurements, e.g. at least the vibrations, to be simulated for a predetermined mass or aerodynamic imbalance applied to the wind turbine. Sometimes the selected frequency of the rotor is close to the eigenfrequency of the first and second wind turbine natural frequencies, these resonant frequencies may thus be included in the model to provide a more accurate simulation.

According to a special embodiment, the method further comprises the steps of:
placing a balancing mass with a predetermined weight at a predetermined position inside one of the wind turbine blade,
(a) measuring a current mass imbalance within another predetermined time window,
(b) comparing the current mass imbalance with at least a previously measured mass imbalance, and
(c) adjusting at least the weight or the position of the balancing mass depending on the change in the two measured mass imbalances, wherein
the steps (a) to (c) are repeated until the mass imbalance drops below a predetermined threshold range.

In an alternative embodiment of the correction method, the mass imbalance correction may be applied using a trial-and-error technique. Firstly, a balancing mass having a pre-selected weight is placed in a pre-selected location in a selected wind turbine blade. This balancing mass may be a multi-adjustable balancing mass system having one or more adjustment means, e.g. a track, mounting brackets, coupling means, a fluid transfer system or other suitable adjustment means for adjusting the weight and/or location of the balancing mass. In example, the weight and position of this balancing mass may initially be determined based on a qualified guess. The imbalance factor and imbalance phase determined from the latest measurement, e.g. the first or third measurement, may be used to select the wind turbine blade in which this balancing mass is placed and thereby providing a qualified guess of the required mass correction.

The vibrations and rotational positions are measured within a current time window. The mass imbalance, e.g. a current imbalance factor and/or a current imbalance phase, is then determined based on the measured data in a first sub-step. This currently measured mass imbalance is compared to one or more previously measured mass imbalances, e.g. at least one previous imbalance factor and/or at least one previous imbalance phase, in a second sub-step. The changes in the mass imbalance are evaluated in a third sub-step to determine whether the weight and/or location of the balancing mass should be adjusted or not. If the mass imbalance, e.g. the imbalance factor, is still outside the threshold range, then the weight of the balancing mass is increased or decreased depending on the change. Additionally or alternatively, the balancing mass is moved towards the tip end or the blade root into a new location depending on the change. This process, i.e. the sub-steps (a) to (c), is repeated for any number of successive times, e.g. one to five times, or until the mass imbalance has dropped to a level located within the threshold range. The balancing mass may then be fixed to the wind turbine blade in its current location. Alternatively, this balance mass is removed and another balancing mass specifically designed with the same weight is mounted at the same location. This provides an alternative way of correcting the mass imbalance that limits the amount of calculations required to determine the required mass imbalance correction.

The balancing mass may alternatively be fixed or mounted with its current weight in its previous location and/or the balancing mass is reduced to its previous weight and fixed or mounted in its current location. This provides a simple way of damping the mass imbalance without the worker having to move around on the exterior of the wind turbine blade.

These above-mentioned steps may be carried out for just one of the wind turbine blades, preferably these steps are repeated for at least two of the wind turbine blades.

An object of the invention is also achieved by a wind turbine comprising a wind turbine tower, a nacelle arranged on top of the wind turbine tower, and a generator connected to a rotatable rotor with at least two wind turbine blades, the rotor has a mass distribution defined by each of the wind turbine blades, wherein the wind turbine further comprises a control system configured to control the operation of the wind turbine, the control system is connected to at least one vibration sensor, e.g. an accelerometer, configured to measure vibrations of said rotor in at least one direction, wherein the control system is further configured to monitor the vibrations of the rotor within at least one time window characterised in that the control system is further configured to detect a mass imbalance of the rotor, wherein the mass imbalance is indicative of a rotor with a temporary unmodified mass distribution, and to determine at least one imbalance factor and at least one imbalance phase based on the measured data, wherein the control system is further configured to determine at least one correction action based on the at least one imbalance factor and the at least one imbalance phase, the at least one correction action being applied to at least one of said wind turbine blades, wherein the at least one correction action is a balancing moment indicative of a mass correction of the at least one of said wind turbine blades.

This provides a wind turbine in which the control system is configured to monitor the rotor imbalance and calculate the required correction action needed to balance the rotor for all rotational speed and, thus, all wind speed conditions. No need for workers to visit the wind turbine site and set up test equipment for determining the type of the rotor imbalance. The correction angle for each wind turbine blade and/or the required balancing moment are calculated by an internal or distributed controller configured to analyse the measured data. Alternatively, the measurements are transmitted to a remote monitoring or computer unit configured to analyse the measured data and to calculate the correction angle and/or balancing moment. This reduces the time and costs for correcting the aerodynamic and/or mass imbalances as the worker only has to visit the wind turbine if installation of balancing mass or adjustment of the fixed pitch angle is required. If no balancing mass is required or the wind turbine comprises a pitch system, the worker, operator or the control system is able to remotely implement the required correction angle.

The above-mentioned correction method is implemented as an algorithm into the processor of the control system or programmed into the control logic of the control system. The control system comprises a wired or wireless communications module for communication with another wind turbine control system and/or a remote unit. The control system further comprises a memory unit for storing the measured data, the various data determined or calculated by the control system, and other relevant data relating to the operation of the wind turbine.

According to one embodiment, the at least one vibration sensor is arranged on or near the rotor hub or the nacelle.

Vibrations are measured by at least one vibration sensor arranged in or on the wind turbine, e.g. the rotor hub, the wind turbine blade, the nacelle, or the upper end of the wind turbine tower. The vibration sensor may be a two-dimensional accelerometer configured to measure accelerations in either axial or lateral directions of the nacelle. The accelerometer may instead be configured to measure the accelerations in both the axial direction and the lateral direction. Alternatively, separate accelerometers for measuring the accelerations in separate directions may be used, one for each direction. The rotational position is measured by at least one angular sensor, e.g. a rotary encoder. The angular sensor may include a calibration method or receive a calibration signal for compensating any drifts in the measured angular signal. The present control system does require an angular sensor and, thus, a rotational position measurement in order to determine the required correction action. However, if an angular sensor or a rotational position measurement is available, then this signal can be used by the present control system to determine the required correction action.

According to one embodiment, the control system is further configured to calculate at least one correction angle for the at least one of said wind turbine blades and optionally to transmit this correction angle to a pitch controller which is configured to adjust the pitch angle of that wind turbine blade based on the received correction angle.

The control system is configured to send a pitch control signal to the pitch controller of the pitch system which in turn applies the correction angle to the respective wind turbine blade. Alternatively, the worker adjusts the mounting interfaces between the wind turbine blade and the rotor hub so that the fixed wind turbine blade is moved, e.g. rotated, into the correction angle. Sensors located on or relative to the wind turbine, e.g. the accelerometers and the angular sensor, measure the behaviour of the wind turbine within one or more time windows which in turn are stored in the local memory unit. The control system may be configured to transmit these measured data to the remote monitoring unit which is configured to analyse the received data and calculate the correction action. The control system is configured to determine the correction angle for each wind turbine blade by solving the equation (1), (3) using the imbalance factor and imbalance phase as described above. This allows for an exact calculation of the required correction angle compared to the correction method of U.S. Pat. No. 8,261, 599 B2 which relies on image data processing to determine the correction angle.

After this correction action is completed, or when the entire correction process is completed, an optional optimiser unit in the control system may be configured to receive these corrected pitch angles and determine the optimised pitch angles for maximum power production. These optimised pitch angles may then be transmitted to the pitch controller which is configured to pitch the wind turbine blades into these corrected/optimised pitch angles.

The control system is further configured to use the imbalance factor and imbalance phase to calculate a mass correction as described above, once the rotor is aerodynamically balanced. A mathematical or aeroelastic model may be used to determine an initial value of the parameters used to calculate the mass moment required to correct the mass imbalance. Unlike the embodiment of U.S. Pat. No. 8,261, 599 B2, the control system is able to calculate this mass moment using the same equation (1), (3) as used to calculate the correction angle by simply changing the set of parameters in the equation as described above. Alternatively, the control system is configured to receive one of more of these parameters from another wind turbine control system and then calculate the mass moment correction using these parameters. This allows the required balancing mass to be determined without having to place test weights on the outside of the wind turbine blade, thus saving time and costs of the correction process. Furthermore, this provides a simplified correction process as the parameters can be validated on one wind turbine and then used to correct a mass imbalance in another wind turbine having similar configurations.

In an alternative embodiment, a trial-and-error based correction method is implemented in the control system for correcting a mass imbalance if no aerodynamic imbalance correction is needed. In this embodiment, a worker and a series of pre-selected balancing masses are transported out to the wind turbine site. The location and/or weight of the balancing mass are altered according to the changes in the imbalance factor and/or imbalance phase of the measured mass imbalance determined by the control system. Once the optimal location and weight have been detected, then the balancing mass is fixated or mounted to the interior of the wind turbine at that location. This provides a simple way of reducing the mass imbalance without the worker having to move around on the exterior of the wind turbine blade. This also enables the mass correction to be determined without having to repeat the mass correction calculation multiple times.

According to one embodiment, the control system is further configured to analyse at least the imbalance factors to identify any changes in the rotor imbalance, wherein the control system is configured to compare these changes to one or more predetermined time windows to determine the frequency at which these changes occur.

The correction method can further be used to analyse the measured rotor imbalance to identify the changes in the rotor imbalance between the individual measurements. One or more predetermined time windows are used to determine the frequency at which these changes occur. The identified changes as well as the determined frequency may be transmitted to the operator thus allowing the operator to distinguish between short-, medium- and long term changes. Short term changes are defined as changes occurring over a relative short time period, e.g. hours, for example caused by ice accretion on the wind turbine blades. Medium term changes are defined as changes occurring over a longer time period, e.g. days, for example caused by dust accretion on the wind turbine blades. Finally, long term changes are defined as changes occurring over an even longer time period, e.g. months, for example caused by the blade wear. This allows the operator to determine the necessary action, e.g. if the wind turbine blades need to be cleaned or replaced.

This correction method can also be used to check if the mounting tolerances are within acceptable ranges without any physically interaction with the wind turbine. This is particularly relevant for stall operated wind turbines, such as fixed pitch wind turbines.

DESCRIPTION OF THE DRAWING

The invention is described by example only and with reference to the drawings, wherein.

Figure 1:
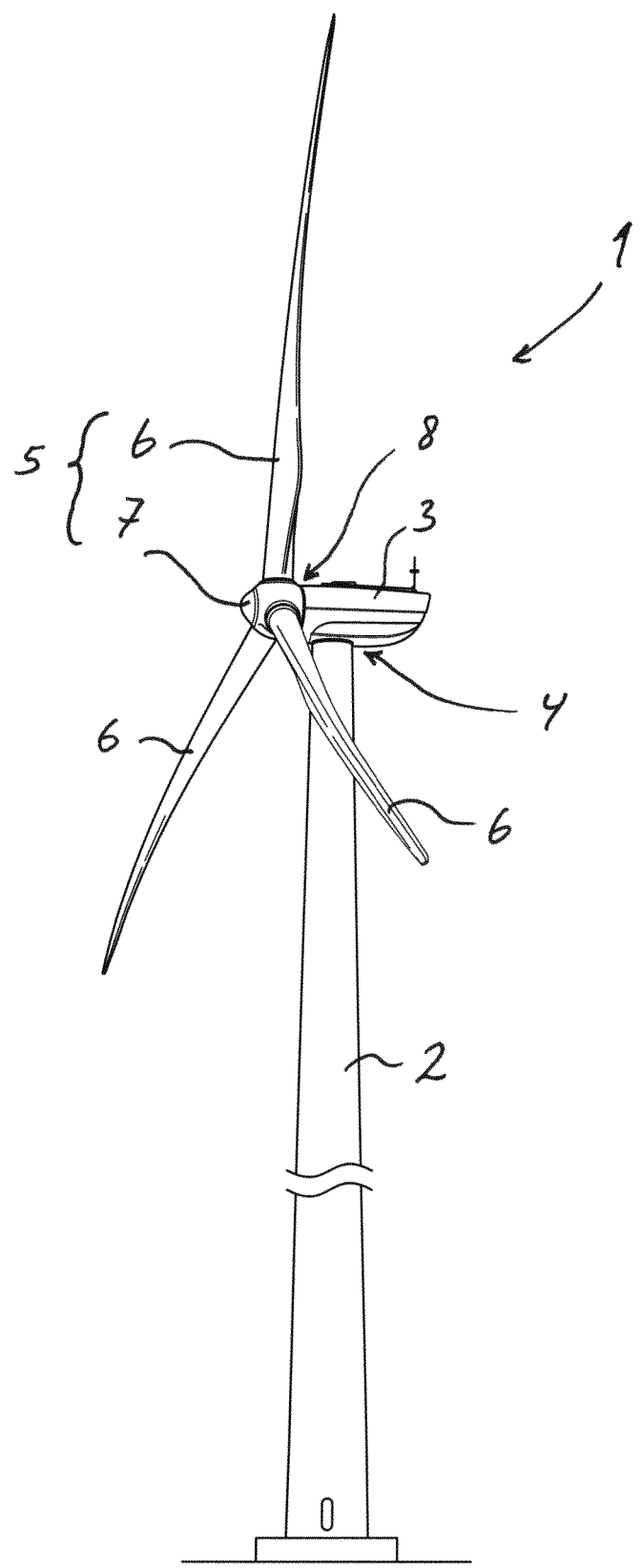
FIG. 1 shows an exemplary embodiment of a wind turbine with a rotor assembly.

In the following text, the figures will be described one by one and the different parts and positions seen in the figures will be numbered with the same numbers in the different figures. Not all parts and positions indicated in a specific figure will necessarily be discussed together with that figure.

REFERENCE LIST

1 Wind turbine
2 Wind turbine tower
3 Nacelle
4 Yaw system

5 Rotor
6 Wind turbine blades
7 Hub
8 Pitch system
9 Control system
10 Acceleration sensor
11 Amplitude of rotor imbalance
12 Rotational position
13 Imbalance phase
14 Graphs of the amplitude before and after the correction process
15 Graphs of the imbalance factor before and after the correction process
16 Graphs of the imbalance phase before and after the correction process

DETAILED DESCRIPTION OF THE INVENTION

FIG. 1 shows an exemplary embodiment of a wind turbine 1 with a rotor assembly. The wind turbine 1 comprises a wind turbine tower 2, a nacelle 3 arranged on top of the wind turbine tower 2. A yaw system 4 comprising at least a yaw bearing unit is provided between the wind turbine tower 2 and the nacelle 3. A rotor 5 is arranged relative to the nacelle 3 and rotatably connected to a generator unit (not shown). At least two wind turbine blades 6, here three are shown, are mounted to a hub 7 of the rotor 5.

Each wind turbine blade 6 comprises an aerodynamically shaped body having a tip end and a blade root. The wind turbine is here shown with full-span pitchable blades, alternatively fixed full-span blades may be used instead. An optional pitch system 8 comprising at least a pitch bearing unit is arranged between the hub 7 and the blade root of the wind turbine blade 6.

Figure 2:
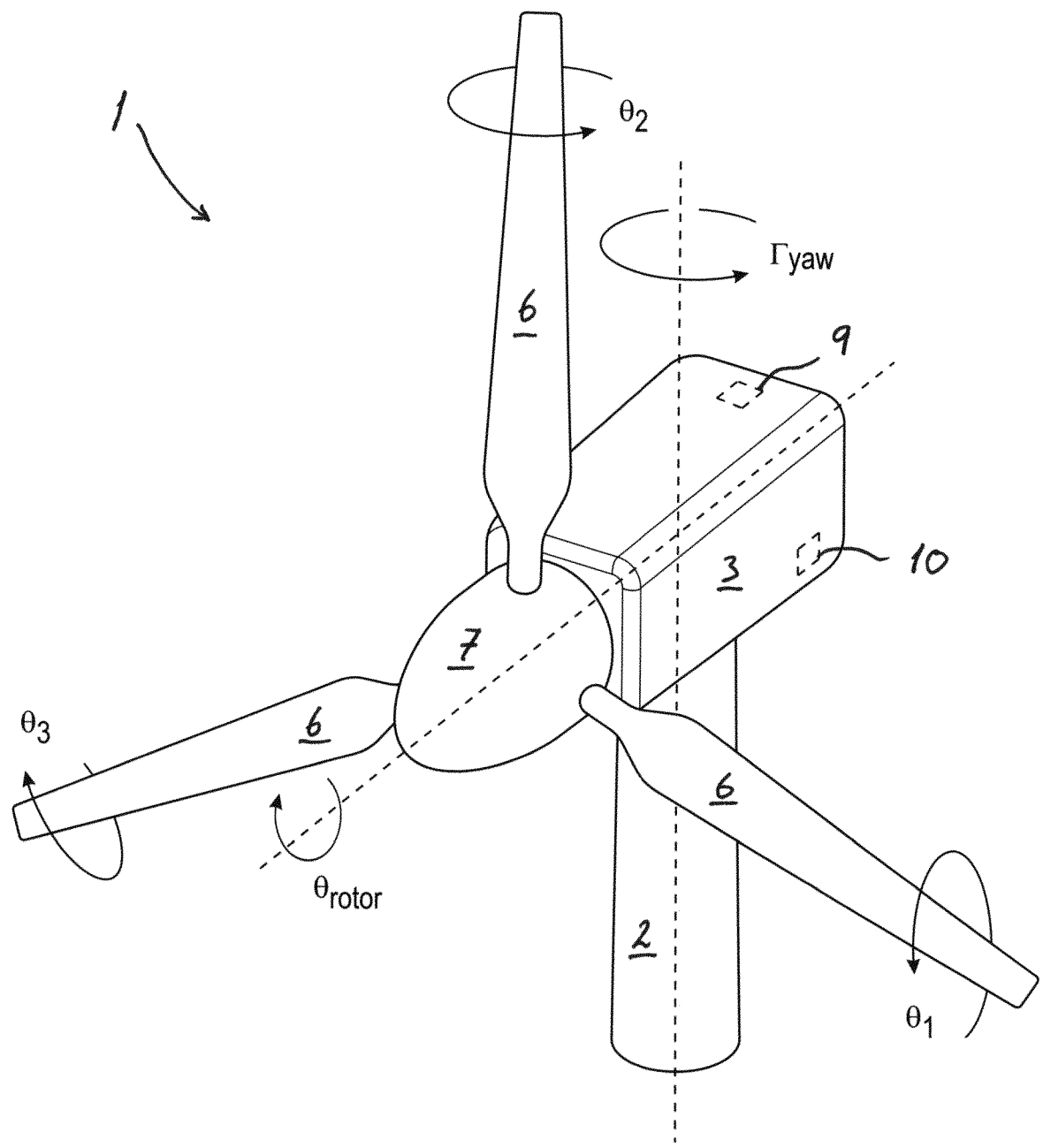
FIG. 2 shows the rotor and nacelle of the wind turbine with their respective pitch angles, rotational position and yaw angle.

FIG. 2 shows the wind turbine 1 in the form of a variable pitch wind turbine where the wind turbine blades 6 are configured to pitch by means of the pitch system around a longitudinal axis, e.g. a centre axis of the pitch bearing. The individual pitch angle $\theta_1$, $\theta_2$, $\theta_3$ for each of the individual wind turbine blades 6 is controlled individually or synchronously by means of a pitch controller that forms part of a control system 9, e.g. the wind turbine controller. The rotor 5 and nacelle 3 are configured to yaw around a longitudinal axis, e.g. a centre axis of the yaw bearing. The yaw angle $\Gamma_{yaw}$ is controlled by a yaw controller that further forms part of the control system 9.

The control system 9 is further configured to monitor the rotational position $\theta_{rotor}$ by means of one or more angular sensors (not shown) arranged relative to the rotor. The measured data from the angular sensors is processed by the control system 9 to determine the respective rotational positions of the wind turbine blades 6. One or more accelerometers 10 are arranged on or in the upper part of the wind turbine 1 for measuring the vibrations of the structure. The measured data from the accelerometers are further processed by the control system 9.

Figure 3:
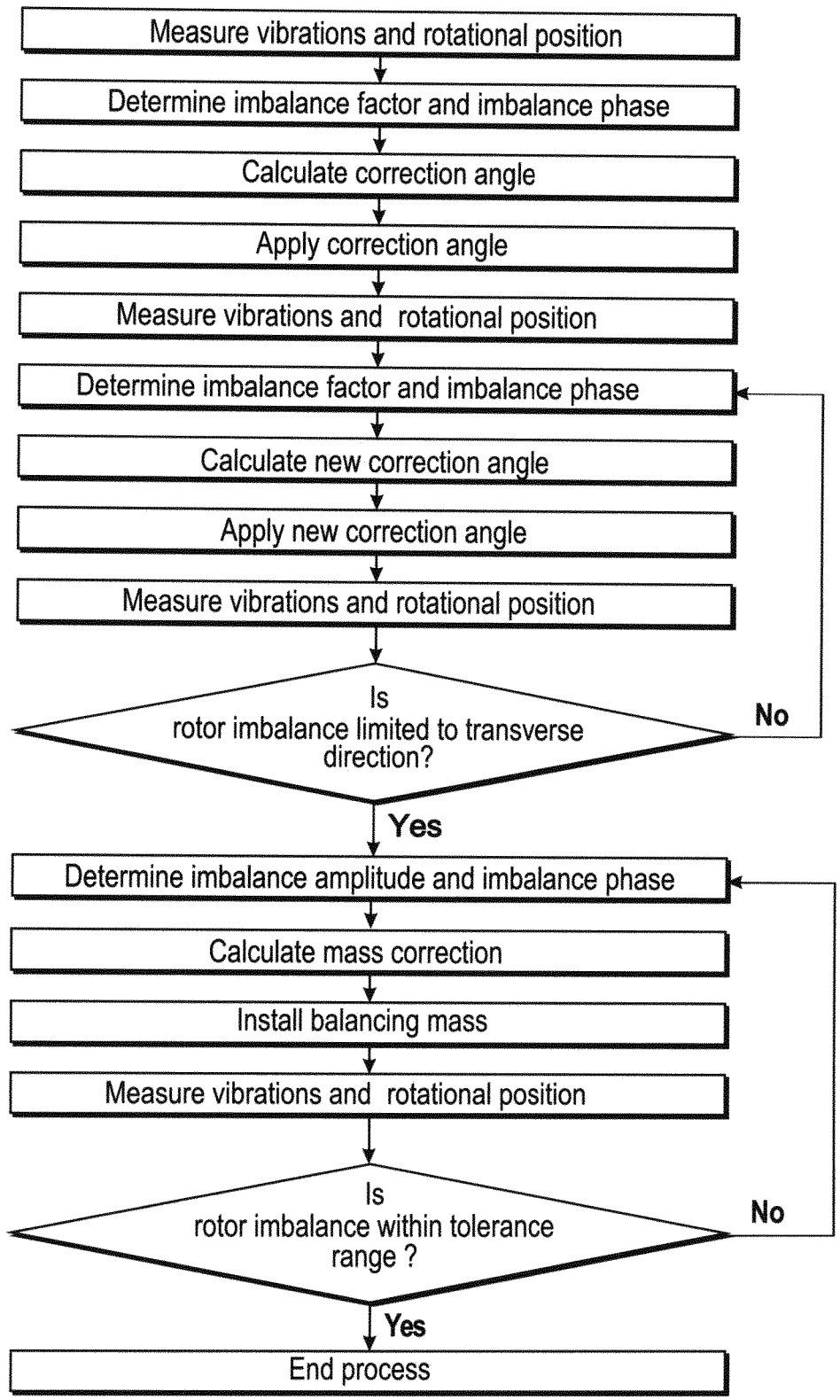
FIG. 3 shows a first embodiment of a correction method according to the invention for balancing the rotor.

FIG. 3 shows a flowchart of a first embodiment of a correction method for correcting a rotor imbalance experienced in the rotor 5. Initially, the control system 9 analyses the measured data to determine if an imbalance correction is needed. If so, the control system 9 detects whether the rotor 5 is aerodynamic balanced or imbalanced based on the axially measured data from the accelerometers. The parameters are measured over a predetermined time window.

If the rotor is aerodynamically imbalanced, the control system 9 determines a first imbalance factor and a first imbalance phase in the axial direction based on the measured data. The required correction angles for balancing the wind turbine blades 6 are then calculated using a first set of parameters in the equation. These initial values of the parameters are preferably derived from a model of the behaviour of the wind turbine system. The correction angles are applied to the respective wind turbine blades 6, and afterwards a second measurement is performed.

The control system 9 then determines a second imbalance factor and a second imbalance phase based on this second measurement. New correction angles for the wind turbine blades 6 are then calculated based on the second imbalance factor and imbalance phase. The values of the parameters used to calculate the correction angles are adjusted based on the first and second imbalance factors and first and second imbalance phases to provide a better representation of the actual conditions. This may be done before or after calculating the new correction angle for the respective wind turbine blades 6. The new correction angles are applied to the respective wind turbine blades 6 and afterwards a third measurement is performed.

The control system 9 analyses this third measurement to determine whether additional correction actions are required. If the rotor 5 is aerodynamically balanced, e.g. if the vibrations in axial direction are within a predetermined threshold range, then the control system 9 proceeds to detect if a mass correction is required. The correction process is repeated if further aerodynamic corrections are needed.

If the rotor is mass imbalanced, the control system 9 determines a third imbalance factor and a third imbalance phase in the lateral direction based on this third measurement. A balancing mass moment indicative of a mass correction is afterwards calculated using a second set of parameters in the equation. The weight and location of the balancing mass is then calculated for one wind turbine blade 6 based on this balancing moment. The respective balancing masses are installed in the respective wind turbine blades 6 and afterwards a fourth measurement is performed.

The control system 9 analyses this fourth measurement to determine whether additional correction actions are required. If the rotor 5 is mass balanced, e.g. if vibrations in lateral direction are within a predetermined threshold range, then the correction process is terminated. Otherwise the correction process is repeated if further mass corrections are needed.

Figure 4:
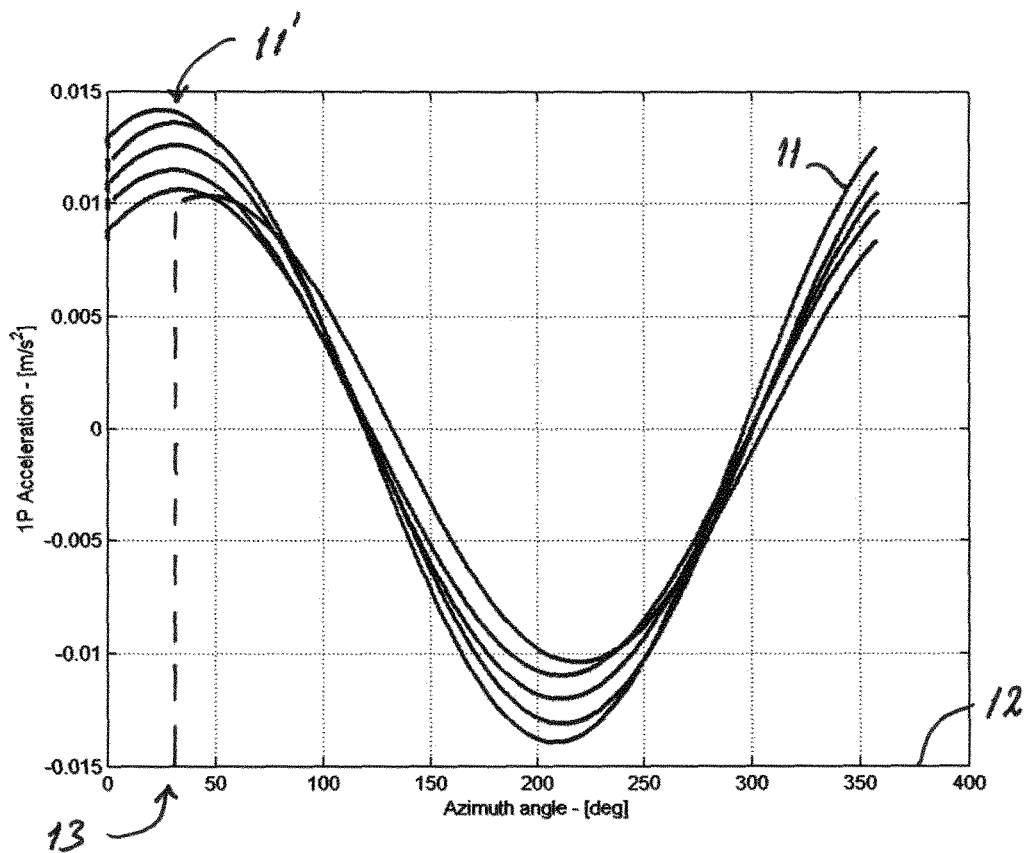
FIG. 4 shows a graph of the amplitude of an exemplary measured rotor imbalance as function of the rotational position.

FIG. 4 shows a graph of the amplitude 11 at the 1P frequency of an exemplary measured rotor imbalance as function of the rotational position 12 of one of the wind turbine blades 6. As indicated in the graph, the amplitude 11 forms a sinus shaped curve along the rotational position of that wind turbine blade. The graph shows five revolutions of that wind turbine blade 6 where each new revolution is re-started from zero degrees.

The imbalance phase 13 is determined as the rotational position in which the amplitude 11 has its greatest value 11', e.g. its maximum or minimum peak value. The imbalance phase is preferably an averaged value for that measured time window.

Figure 5:
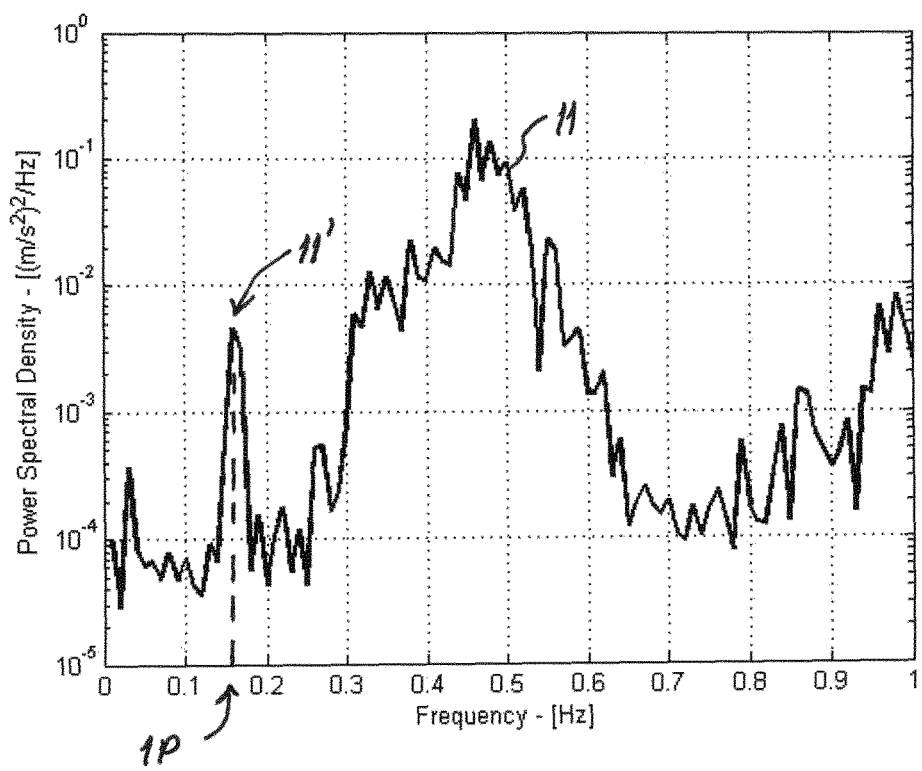
FIG. 5 shows a graph of the frequency spectra of the rotor imbalance of FIG. 4 measured in the axial direction.

FIG. 5 shows a graph of the frequency spectra of the rotor imbalance of FIG. 5 measured in the axial direction. The graph shows the amplitude 11 as function of the frequency of the measured vibrations. The 1P frequency is determined based on the rotational speed of the rotor 5 and is used to identify the peak 11' of the amplitude 11.

Figure 6:
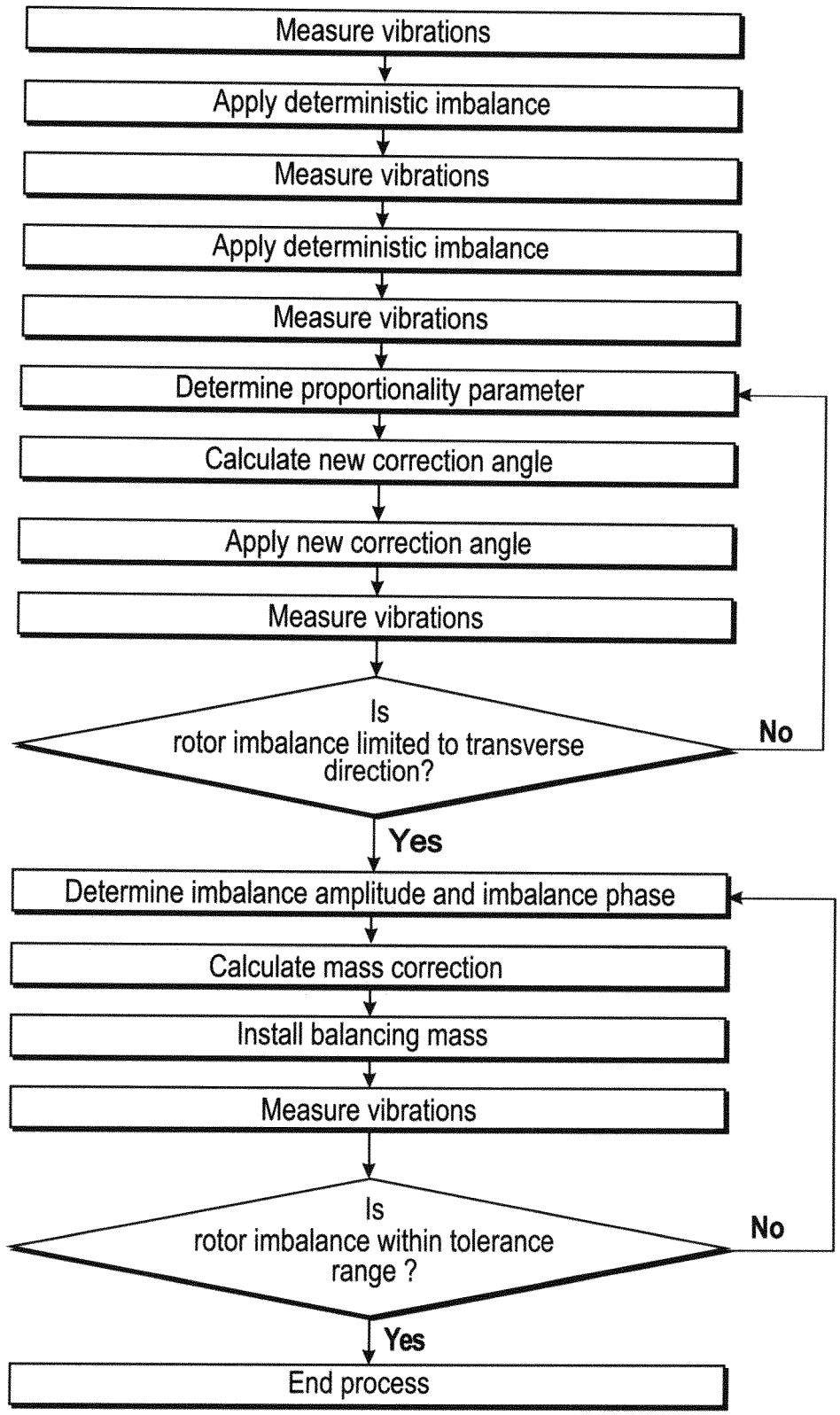
FIG. 6 shows a second embodiment of the correction method according to the invention.

FIG. 6 shows a flowchart of a second embodiment of a correction method for correcting a rotor imbalance experienced in the rotor 5. This embodiment differs from the embodiment of FIG. 3 as no measurement of the rotational position is needed and no correction actions are performed after the first and second measurements respectively.

If the rotor is detected to be aerodynamically imbalanced, the control system 9 determines a first imbalance factor and a first imbalance phase in the axial direction based on this first measurement of the vibrations. A deterministic imbalance is then applied to the rotor and a second measurement of the vibrations is afterwards carried out.

The control system 9 determines a second imbalance factor and a second imbalance phase based on this second measurement and another deterministic imbalance is then applied to the rotor. A third measurement of the vibrations is carried out afterwards and the control system 9 determines a third imbalance factor and a third imbalance phase based on this third measurement.

The imbalance factors and imbalance phases of these three measurements are then used to calculate and update values of the parameters used to calculate the required correction action. The control system 9 calculates the correction angles for the wind turbine blades 6 using these adjusted parameters which are afterwards applied to the wind turbine blades 6.

Another measurement is then carried out which is afterwards analysed by the control system 9 to determine whether additional correction actions are required. If the rotor 5 is aerodynamically balanced, then the control system 9 proceeds to correct any mass imbalance as described in regards to FIG. 3 using these adjusted parameters. If not, then another run of the correction process is carried out.

Figure 7:
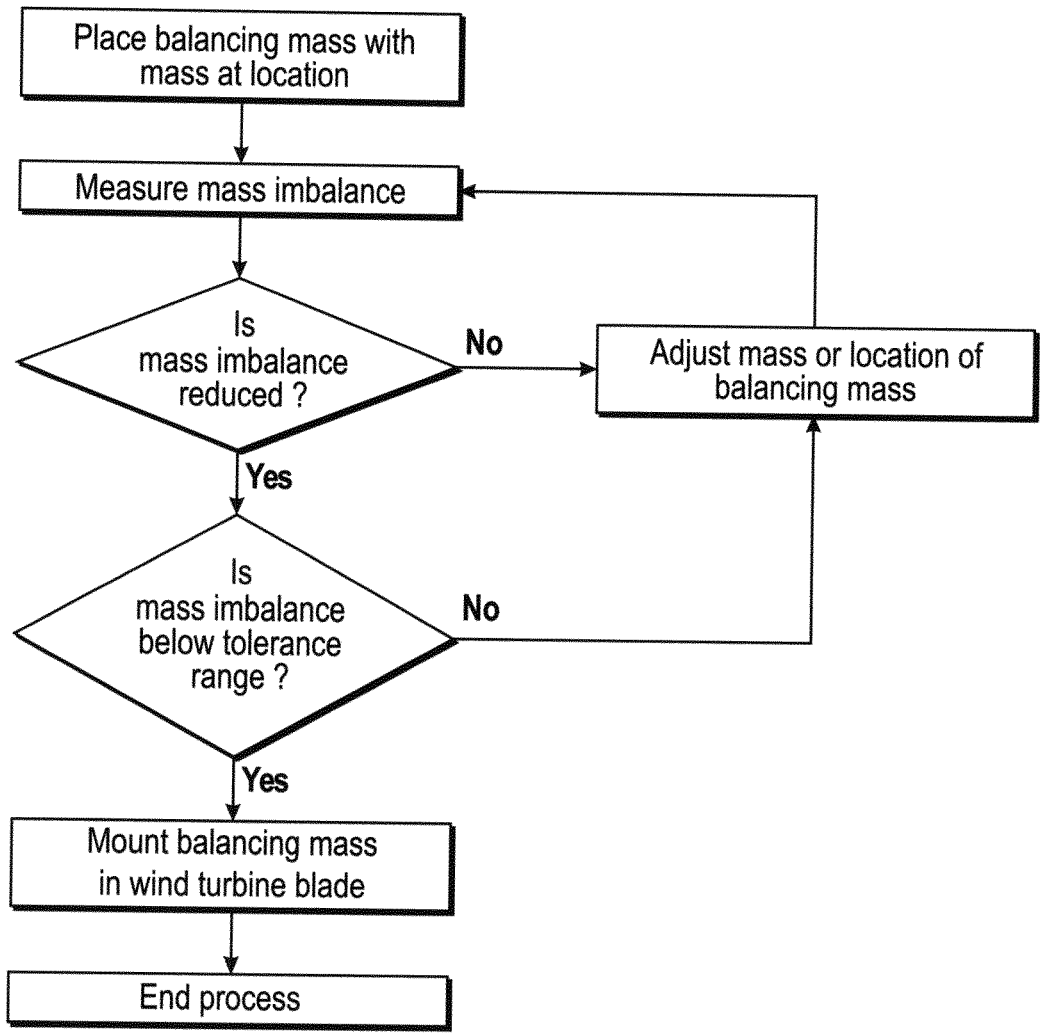
FIG. 7 shows a third embodiment of the correction method according to the invention.

FIG. 7 shows a second exemplary correction method for correcting a mass imbalance when no aerodynamic corrections are performed first. Initially, a balancing mass with a pre-selected mass is temporary placed in a pre-selected location inside one of the wind turbine blades 6.

The rotational position, the vibrations and other relevant control parameters are measured within a predetermined time window, and the control system 9 determines an imbalance factor and an imbalance phase based on the measured data. The control system 9 analyses the imbalance factor and imbalance phase to detect any changes in the mass imbalance, e.g. relative to at least one previously measured set of data. If the changes indicate that the mass imbalance is changed, e.g. reduced, but is still outside the threshold range, then the location and/or weight of the balancing mass is adjusted.

This process is repeated until the control system 9 detects that the mass imbalance is within the threshold range. The balancing mass with its current weight is then permanently installed at its current location. Alternatively, another balancing mass with the same weight is installed at the same location.

Figure 8:
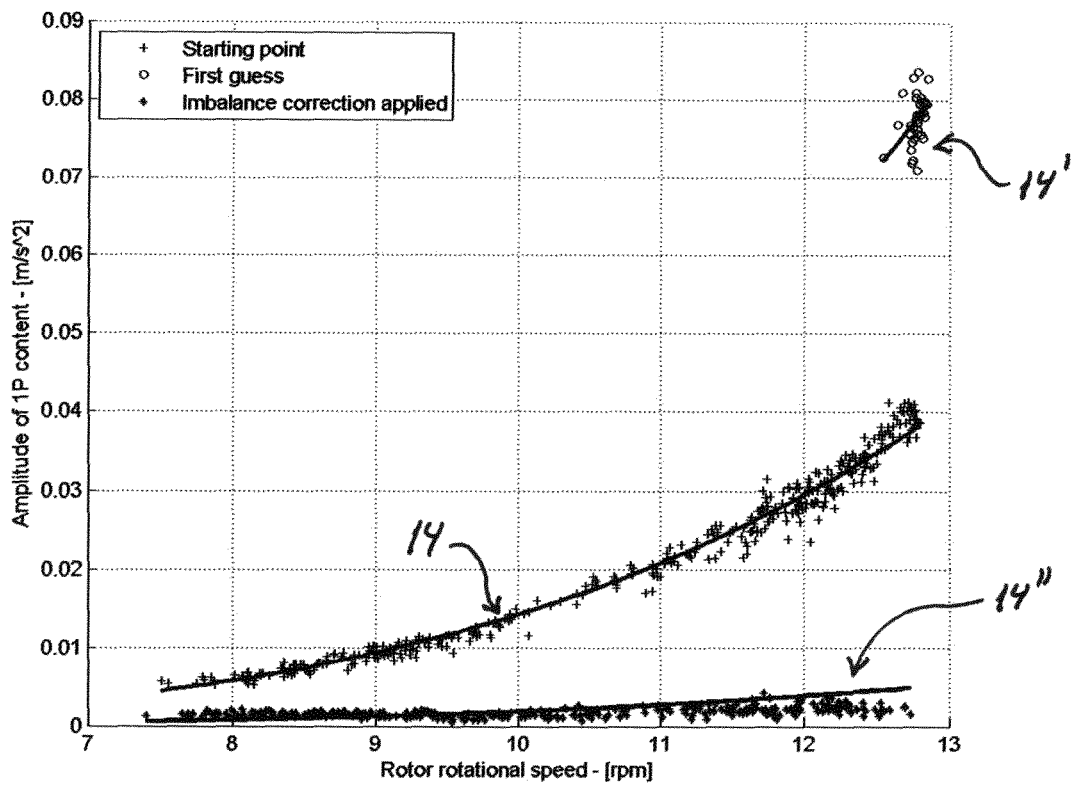
FIG. 8 shows three graphs of the amplitude of an exemplary measured rotor imbalance before and after a first and second run of the correction process.

FIG. 8 shows three graphs of the amplitude of an exemplary measured rotor imbalance before and after a first and second run of the correction process.

The first graph 14 indicates the amplitude of the measured rotor imbalance before a correction action is applied to the rotor 5. As shown in this graph 14, the amplitude increases exponentially from about 0.005 m/s$^2$ to about 0.04 m/s$^2$ which is indicative of the exemplary rotor imbalance located in the rotor 5. The second graph 14' shows the measured amplitude after a first correction action has been applied to the rotor 5. In this run of the correction process, a qualified guess of the values of the parameters in the equation is used to calculate the required correction action.

The third graph 14" shows the measured amplitude after a second correction action has been applied to the rotor 5. In this run of the correction process, the values of the parameters in the equation have been adjusted before calculating the required correction action. As shown in this graph 14", the amplitude is significantly reduced so that it remains below about 0.04 m/s$^2$. The imbalance factor (shown in FIG. 8) normalises this 1P amplitude and allows for an exact calculation of the required correction action.

Figure 9:
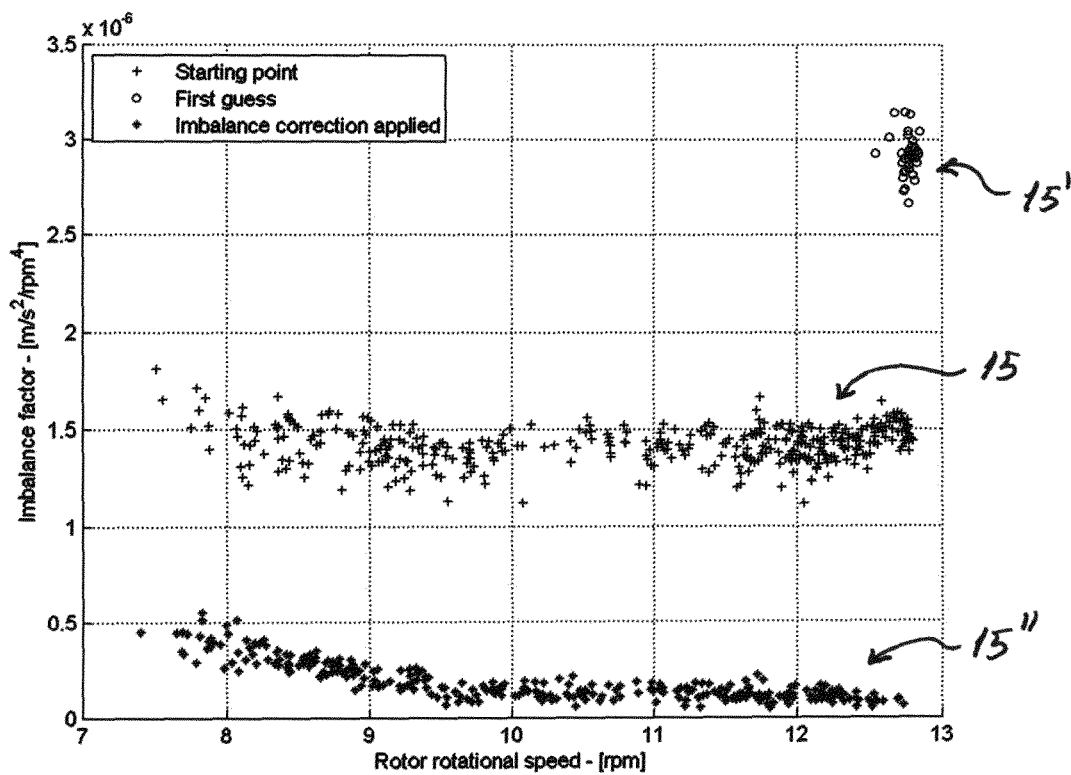
FIG. 9 shows three graphs of the imbalance factor of the rotor imbalance of FIG. 8 before and after the first and second run of the correction process.

FIG. 9 shows three graphs of the imbalance factor of the rotor imbalance of FIG. 8 before and after the first and second correction process. In this example, the rotational speed 12 of the rotor 5 is raised to a power of four.

The first graph 15 shows the determined imbalance factor based on the amplitude shown in FIG. 8 before any correction action is applied. As shown in this graph 15, the values are centred relative to about 1.4 m/s$^2$/rpm$^4$. The second graph 15' and the third graph 15" further show the imbalance factor after the first and second correction actions have been applied to the rotor 5 as mentioned in reference to FIG. 8. As shown in the third graph 15", the imbalance factor is significantly reduced so that it is now located below about 0.5 m/s$^2$/rpm$^4$, thus indicating that the rotor imbalance has been reduced to within acceptable tolerances.

Figure 10:
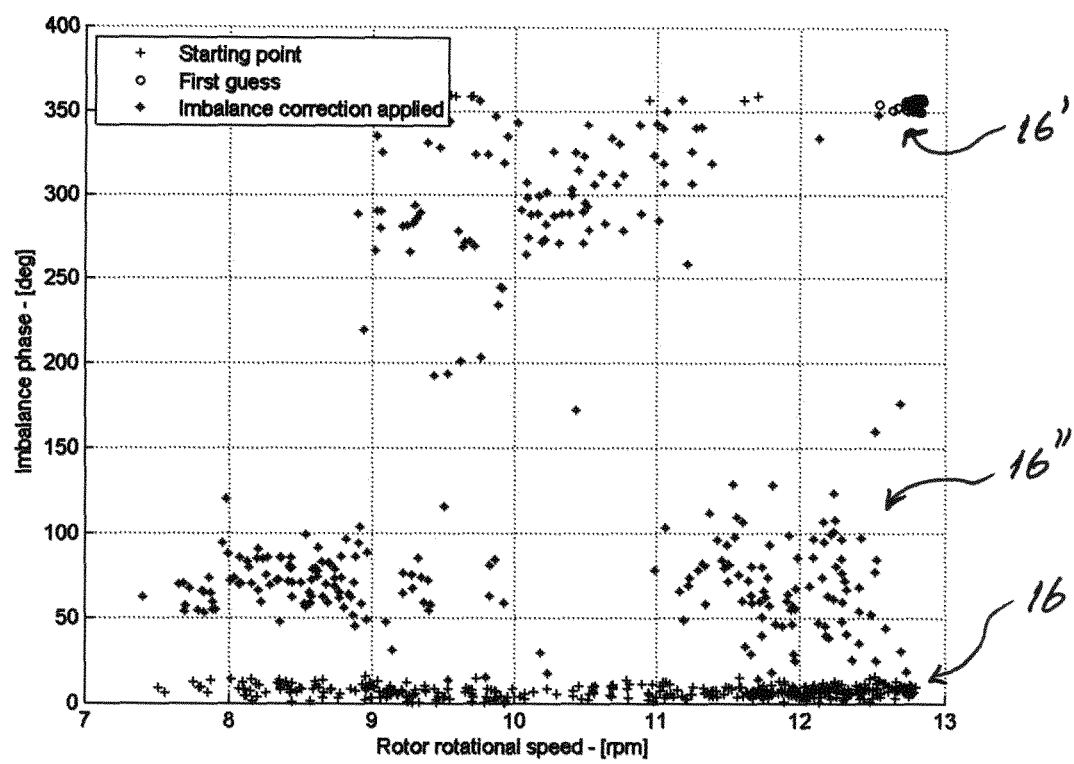
FIG. 10 shows three graphs of the imbalance phase of the rotor imbalance of FIG. 8 before and after the first and second run of the correction process.

FIG. 10 shows three graphs of the imbalance phase of the rotor imbalance of FIG. 8 before and after the first and second correction process.

The first graph 16 shows the imbalance phase of the rotor imbalance before any correction action is applied. As shown in this graph 16, the values are located below or about 20 degrees. The second graph 16' and the third graph 16" further shown the imbalance phase after the first and second correction actions have been applied to the rotor 5 as mentioned in reference to FIG. 8. As indicated in this figure, the values of this third graph 16" are scattered over a large range. This is due to the fact that the imbalance phase is significantly influenced by noise in the measured signal. This also provides an indication that the rotor imbalance has been reduced to within acceptable tolerances.

The invention is not limited to the embodiments described herein, and may be modified or adapted without departing from the scope of the present invention as described in the patent claims below.

The invention claimed is:

1. A method of correcting a rotor imbalance of a wind turbine, the wind turbine comprising a wind turbine tower, a nacelle arranged on top of the wind turbine tower, and a generator connected to a rotatable rotor with at least two wind turbine blades, wherein the method comprises the steps of:

measuring vibrations of the rotor within at least one time window, detecting a mass imbalance of the rotor, the rotor has a mass distribution defined by each of the wind turbine blades, wherein the mass imbalance is indicative of a rotor with an unmodified mass distribution, analysing measured data, including data measurements related to the vibrations, to determine at least one imbalance factor and at least one imbalance phase, applying at least one correction action to at least one of said wind turbine blades for correcting the mass imbalance without test weights placed on the wind turbine blade, wherein the at least one correction action is determined based on the at least one imbalance factor and the at least one imbalance phase, the at least one correction action comprises calculating a balancing moment indicative of a mass correction of the at least one of said wind turbine blades.

2. The method according to claim 1, wherein the step of analysing the measured data further comprises determining at least one imbalance amplitude based on the measured data, wherein the at least one imbalance factor is calculated as function of said at least one imbalance amplitude.

3. The method according to claim 1, wherein the method further comprises the steps of:
   measuring vibrations and rotational positions of the rotor within a first of said time windows, and analysing the measured data to determine at least a first imbalance factor and a first imbalance phase,
   applying a first of said correction actions based on at least the first imbalance factor and the first imbalance phase,
   measuring vibrations and rotational positions of the rotor within a second of said time windows, and analysing the measured data to determine at least a second imbalance factor and a second imbalance phase,
   applying a second of said correction actions based on at least the second imbalance factor and the second imbalance phase.

4. The method according to claim 1, wherein the method further comprises the steps of:
   measuring vibrations of the rotor within a first of said time windows, and analysing the measured data to determine at least a first imbalance factor and a first imbalance phase,
   applying a first rotor imbalance,
   measuring vibrations of the rotor within a second of said time windows, and analysing the measured data to determine at least a second imbalance factor and a second imbalance phase,
   applying a second rotor imbalance,
   measuring vibrations of the rotor within a third of said time windows, and analysing the measured data to determine at least a third imbalance factor and a third imbalance phase,
   wherein the at least one correction action applied is based on at least one of the first, second and third imbalance factors and at least one of the first, second and third imbalance phases.

5. The method according to claim 1, wherein the method further comprises the step of:
   correcting at least one parameter used to calculate the respective correction action based on at least the one imbalance factor.

6. The method according to claim 1, wherein the step of applying the at least one correction action further comprises calculating a weight or a position of a balancing mass based on the balancing moment, wherein the balancing mass is then applied to the at least one of said wind turbine blades.

7. The method according to claim 1, wherein the method further comprises the steps of:
   measuring vibrations and optionally the rotational positions of the rotor within at least one further time window,
   detecting if an aerodynamic imbalance of the rotor is present,
   if said aerodynamic imbalance is present, then calculating at least a correction angle based on at least one further imbalance factor and at least one further imbalance phase of said one further time window, and applying said correction angle to the at least one of said wind turbine blades.

8. The method according to claim 7, wherein the method further comprises the steps of:
   further measuring vibrations and, optionally, the rotational positions of the rotor within at least one additional time window,
   determining if the rotor is mass balanced, and
   calculating a further balancing moment, if mass imbalanced, based on at least a further imbalance factor and at least another imbalance phase of said one additional time window, wherein this further balancing moment is indicative of a further mass correction.

9. The method according to claim 1, wherein the method further comprises the step of:
   deriving at least one parameter used to calculate the respective correction action from a model of the wind turbine, wherein this model at least provides a representation of the vibrations in the wind turbine with a predetermined rotor imbalance.

10. The method according to claim 1, wherein the method further comprises the steps of:
    placing a balancing mass with a predetermined weight at a predetermined position inside one of the wind turbine blade,
    (a) measuring a current mass imbalance within another time window,
    (b) comparing the current mass imbalance with at least a previously measured mass imbalance, and
    (c) adjusting at least the weight or the position of the balancing mass depending on the change in the two measured mass imbalances, wherein
    the steps (a) to (c) are repeated until the mass imbalance drops below a predetermined threshold range.

11. The method according to claim 2, wherein the method further comprises the steps of:
    measuring vibrations and rotational positions of the rotor within a first of said time windows, and analysing the measured data to determine at least a first imbalance factor and a first imbalance phase,
    applying a first of said correction actions based on at least the first imbalance factor and the first imbalance phase,
    measuring vibrations and rotational positions of the rotor within a second of said time windows, and analysing the measured data to determine at least a second imbalance factor and a second imbalance phase,
    applying a second of said correction actions based on at least the second imbalance factor and the second imbalance phase.

12. The method according to claim 2, wherein the method further comprises the steps of:
    measuring vibrations of the rotor within a first of said time windows, and analysing the measured data to determine at least a first imbalance factor and a first imbalance phase,
    applying a first rotor imbalance,
    measuring vibrations of the rotor within a second of said time windows, and analysing the measured data to determine at least a second imbalance factor and a second imbalance phase,
    applying a second rotor imbalance,
    measuring vibrations of the rotor within a third of said time windows, and analysing the measured data to determine at least a third imbalance factor and a third imbalance phase,
    wherein the at least one correction action applied is based on at least one of the first, second and third imbalance factors and at least one of the first, second and third imbalance phases.

13. A wind turbine comprising a wind turbine tower, a nacelle arranged on top of the wind turbine tower, and a generator connected to a rotatable rotor with at least two wind turbine blades, the rotor has a mass distribution defined by each of the wind turbine blades, wherein the wind turbine further comprises a control system configured to control the operation of the wind turbine, the control system is connected to at least one vibration sensor, including an accelerometer, configured to measure vibrations of said rotor in at least one direction, wherein the control system is further configured to monitor the vibrations of the rotor within at least one time window wherein the control system is further configured to detect a mass imbalance of the rotor, wherein the mass imbalance is indicative of a rotor with an unmodified mass distribution, and to determine at least one imbalance factor and at least one imbalance phase based on measured data, including data measurements related to vibrations, wherein the control system is further configured to determine at least one correction action based on the at least one imbalance factor and the at least one imbalance phase for correcting the mass imbalance without test weights placed on the wind turbine blade, the at least one correction action being applied to at least one of said wind turbine blades, wherein the at least one correction action is a balancing moment indicative of a mass correction of the at least one of said wind turbine blades.

14. The wind turbine according to claim 13, wherein the at least one vibration sensor is arranged on or near a rotor hub or the nacelle.

15. The wind turbine according to claim 13, wherein the control system is further configured to calculate at least one correction angle for the at least one of said wind turbine blades and, optionally, to transmit this correction angle to a pitch controller which is configured to adjust the pitch angle of that wind turbine blade based on the received correction angle.

16. The wind turbine according to claim 13, wherein the control system is further configured to analyse at least the imbalance factors to identify any changes in the rotor imbalance, wherein the control system is configured to compare these changes to one or more predetermined time windows to determine a frequency at which these changes occur.

17. A method of correcting a rotor imbalance of a wind turbine, the wind turbine comprising a wind turbine tower, a nacelle arranged on top of the wind turbine tower, and a generator connected to a rotatable rotor with at least two wind turbine blades, wherein the method comprises the steps of:
measuring vibrations of the rotor within at least one time window,
detecting a mass imbalance of the rotor, the rotor has a mass distribution defined by each of the wind turbine blades, wherein the mass imbalance is indicative of a rotor with an unmodified mass distribution,
analysing measured data, including data measurements related to the vibrations, to determine at least one imbalance factor and at least one imbalance phase,
applying at least one correction action to at least one of said wind turbine blades for correcting a mass imbalance without test weights placed on the wind turbine blade, wherein the at least one correction action is determined based on the at least one imbalance factor and the at least one imbalance phase, the at least one correction action comprises calculating a balancing moment indicative of a mass correction of the at least one of said wind turbine blades, wherein at least one parameter used to calculate the balancing moment is transmitted to at least one other wind turbine, wherein this parameter is used to calculate a mass correction for the other wind turbine.

* * * * *